US011734908B2

(12) United States Patent
Kandpal et al.

(10) Patent No.: US 11,734,908 B2
(45) Date of Patent: Aug. 22, 2023

(54) RANDOMLY GENERATED BLOBS TO IMPROVE OBJECT-DETECTION TRAINING FOR FRAMED VIDEO CONTENT

(71) Applicant: GOOGLE LLC, Mountain View, CA (US)

(72) Inventors: Mayank Kandpal, Zurich (CH); Bakhodir Ashirmatov, Zurich (CH); Filip Pavetic, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 296 days.

(21) Appl. No.: 17/228,750

(22) Filed: Apr. 13, 2021

(65) Prior Publication Data

US 2022/0327322 A1 Oct. 13, 2022

(51) Int. Cl.

*G06V 10/25* (2022.01)
*G06N 3/08* (2023.01)
*G06V 10/26* (2022.01)
*G06V 10/46* (2022.01)

(52) U.S. Cl.

CPC ............... *G06V 10/25* (2022.01); *G06N 3/08* (2013.01); *G06V 10/26* (2022.01); *G06V 10/462* (2022.01)

(58) Field of Classification Search

CPC ........ G06V 10/25; G06V 10/26; G06V 10/34; G06V 10/462; G06V 10/44; G06V 10/774; G06V 10/82; G06N 3/0464; G06N 3/08; G06T 7/155; G06T 2207/20036

See application file for complete search history.

(56) References Cited

U.S. PATENT DOCUMENTS

2017/0061625 A1* 3/2017 Estrada ..................... G06T 7/75
2021/0241469 A1* 8/2021 Alessandrini .... G06V 30/19133
2021/0295065 A1* 9/2021 Arai ..................... B60Q 1/0023
2022/0269886 A1* 8/2022 Wu ..................... G06V 10/774

FOREIGN PATENT DOCUMENTS

JP 2005217599 A * 8/2005

* cited by examiner

*Primary Examiner* — Carol Wang

(74) *Attorney, Agent, or Firm* — Young Basile Hanlon & MacFarlane, P.C.

(57) ABSTRACT

Generating a training image for use in training a region-of-interest detector that is trained to detect regions-of-interest within images includes generating a closed geometric shape; filling the closed geometric shape with a filler to obtain a blob; overlaying the blob on an edge of an image to obtain the training image, where the image includes a region-of-interest and a background region, and where the edge separates the region-of-interest from the background region; and using the training image to train the region-of-interest detector to detect a boundary of the region-of-interest. An input to the region-of-interest detector in a training phase includes the training image and a first indication of coordinates of the region-of-interest in the training image. An output of the region-of-interest detector includes a second indication of an area of the training image and a probability of the area of the training image being the region-of-interest.

20 Claims, 8 Drawing Sheets

RANDOMLY GENERATED BLOBS TO IMPROVE OBJECT-DETECTION TRAINING FOR FRAMED VIDEO CONTENT

BACKGROUND

Online systems store, index, and make available for consumption various forms of media content to Internet users. This content may take a variety of forms; in particular, video content, including streaming video is widely available across the Internet. Online video systems allow users to view videos uploaded by other users. These online video systems may contain thousands or millions of video files, making management of these video files a challenging task. One challenge is that users upload unauthorized copies of copyrighted video content since online video systems allow users to freely upload video content. As such, online video systems need a mechanism for identifying and removing these unauthorized copies.

Various techniques have been used to automatically detect similarities between video files based on their video content. In the past, various identification techniques (such as an MD5 hash on the video file) have been used to identify exact copies of video files. Generally, a digital "fingerprint" is generated by applying a hash-based fingerprint function to a bit sequence of the video file; this generates a fixed-length monolithic bit pattern (i.e., the fingerprint) that uniquely identifies the file based on the input bit sequence. Fingerprints for files can be compared to detect exact bit-for-bit matches between files. In another technique, a fingerprint can be computed for only the first frame of a video file or for a subset of video frames.

However, these techniques often fail to identify unauthorized videos that include other content that is specifically added to disguise unauthorized content. Such disguising features are referred to herein as distractors. Accordingly, improved techniques for identifying the areas of video frames that may include unauthorized content despite any distractors in the video frames are needed.

SUMMARY

Disclosed herein are aspects of systems, methods, and apparatuses for randomly generating blobs to improve object-detection training for framed video content.

A first aspect is a method for generating a training image for use in training a region-of-interest detector that is trained to detect regions-of-interest within images. The method includes generating a closed geometric shape; filling the closed geometric shape with a filler to obtain a blob; overlaying the blob on an edge of an image to obtain the training image, where the image includes a region-of-interest and a background region, and where the edge separates the region-of-interest from the background region; and using the training image to train the region-of-interest detector to detect a boundary of the region-of-interest. An input to the region-of-interest detector in a training phase includes the training image and a first indication of coordinates of the region-of-interest in the training image. An output of the region-of-interest detector includes a second indication of an area of the training image and a probability of the area of the training image being the region-of-interest.

A second aspect is an apparatus for generating a training image for use in training a region-of-interest detector that is trained to detect regions-of-interest within images. The apparatus includes a processor that is configured to generate a closed geometric shape; fill the closed geometric shape with a filler to obtain a blob; overlay the blob on an edge of an image to obtain the training image, where the image comprises a region-of-interest and a background region, and where the edge separates the region-of-interest from the background region; and train, using the training image, the region-of-interest detector to detect a boundary of the region-of-interest. An input to the region-of-interest detector in a training phase includes the training image. An output of the region-of-interest detector includes an indication of an area of the training image as being the region-of-interest.

A third aspect is a non-transitory computer-readable storage medium that includes executable instructions that, when executed by a processor, facilitate performance of operations for generating a training image for use in training a region-of-interest detector that is trained to detect regions-of-interest within images. The operations include operations to generate a closed geometric shape; fill the closed geometric shape with a filler to obtain a blob; and overlay the blob on an edge of an image to obtain the training image. The image includes a region-of-interest and a background region. The edge separates the region-of-interest from the background region.

These and other aspects of the present disclosure are disclosed in the following detailed description of the embodiments, the appended claims and the accompanying figures.

DETAILED DESCRIPTION

Figure 1:
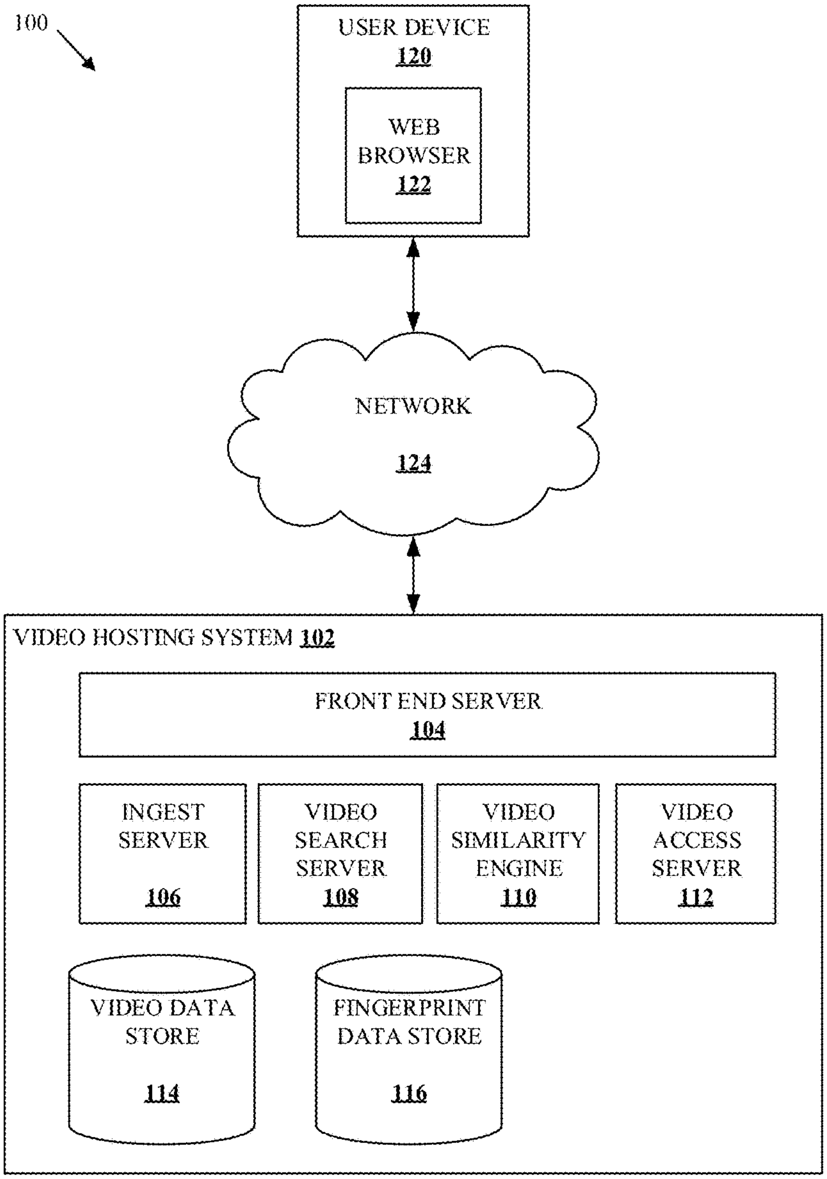
FIG. 1 is a high level block diagram of a system for detecting unauthorized video content.

A media hosting system may receive uploaded media content from users and share the media content with other users. The media hosting system may include facilities (e.g., features, capabilities, algorithms, etc.) for detecting unauthorized uploaded content. An unauthorized uploaded content is content that includes, for example, copyrighted content that may be used without permission from the copyright holder. Unauthorized uploaded content may be automatically removed from the media hosting system or may be subject to take-down notices, which are sent to the uploading users.

To thwart (e.g., confuse, get around, etc.) the detection algorithms of media hosting systems, some users resort to embedding the unauthorized content within static or semi-static frames. As such, an image or a frame of a video may include the unauthorized content in an area that is smaller than the frame where the rest of the frame may include other content. The area of the frame (or image) that may include the unauthorized content is referred to herein as the "image foreground" or the "region-of-interest;" and the rest of the frame (or image) may be referred to herein as the image "background." More generally, region-of-interest can be an area of an image (e.g., a frame of a video) where the main content of the image or video may be displayed or played. A video hosting system, such as the video hosting system 102 of FIG. 1, can include region-of-interest detectors (e.g., modules, algorithms, machine-learning models, etc.) for detecting areas of frames that may include unauthorized content.

Detecting a region-of-interest in a frame (i.e., the area of a frame that may include unauthorized content) includes detecting the edges (e.g., boundary, contour, box, etc.) of the region-of-interest within the frame. An edge, as used herein, refers to the line of separation between the foreground and the background of a frame, which may or may not be a visible edge. An edge may be a smooth transition between the region-of-interest and the background. An edge can be a line overlaid with different shapes.

To Further thwart the area detection algorithms of a video hosting system, users have resorted to obscuring the edges of regions-of-interest with distractors. A distractor as used herein refers to some object that is overlayed on an image between the foreground image and the background image. That is, a distractor overlays an edge between the foreground image and the background image such that a first portion of the distractor overlays the foreground image and a second portion of the distractor overlays the background image. A user who uploads media content to a media hosting system may add several distractors to frames of a video in an attempt to make a region-of-interest undetectable by, and therewith confusing, the region-of-interest detector of the media hosting system. Examples of distractors are described with respect to FIG. 4.

The distractors that may be used to overlay edges of a region-of-interest can have any shape, include any content, have any orientation, overlay any portion or any edge of the region-of-interest, cover any vertex of the region-of-interest, and so on. The distractors can include icons, sketches of superhero characters, pictures of real persons, drawings of buildings, renderings of space ships, patterns, and on and on and on.

The possibilities of the distractors are infinite. As such, a region-of-interest detector that, when presented with a frame, is able to detect the boundary of a region-of-interest must be able to detect the boundary of the region-of-interest despite the distractors. Accurately detecting the region-of-interest (i.e., the area of a frame that may include unauthorized content) despite the distractors can be a critical step in detecting the unauthorized content. As such, detecting the region-of-interest has to be robust and tolerant to all the possible distractors that may be placed on an image.

Figure 9A:
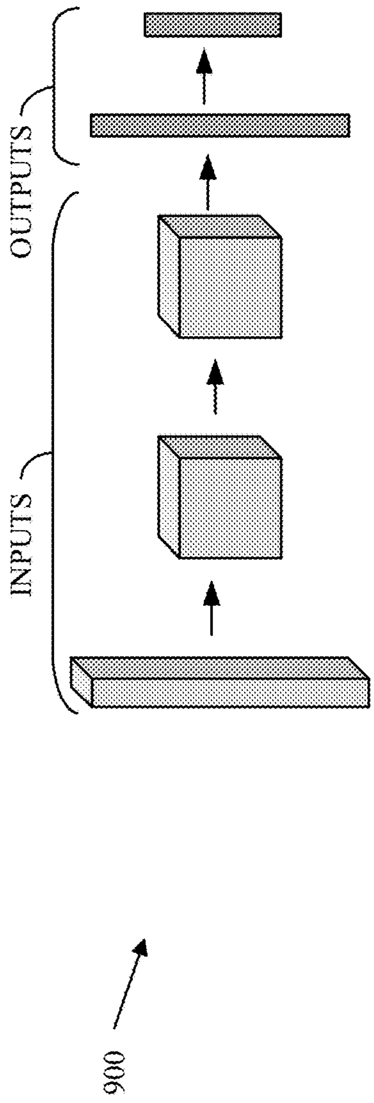
FIGS. 9A-9B are block diagrams of examples of convolutional neural networks (CNNs).
Figure 9B:
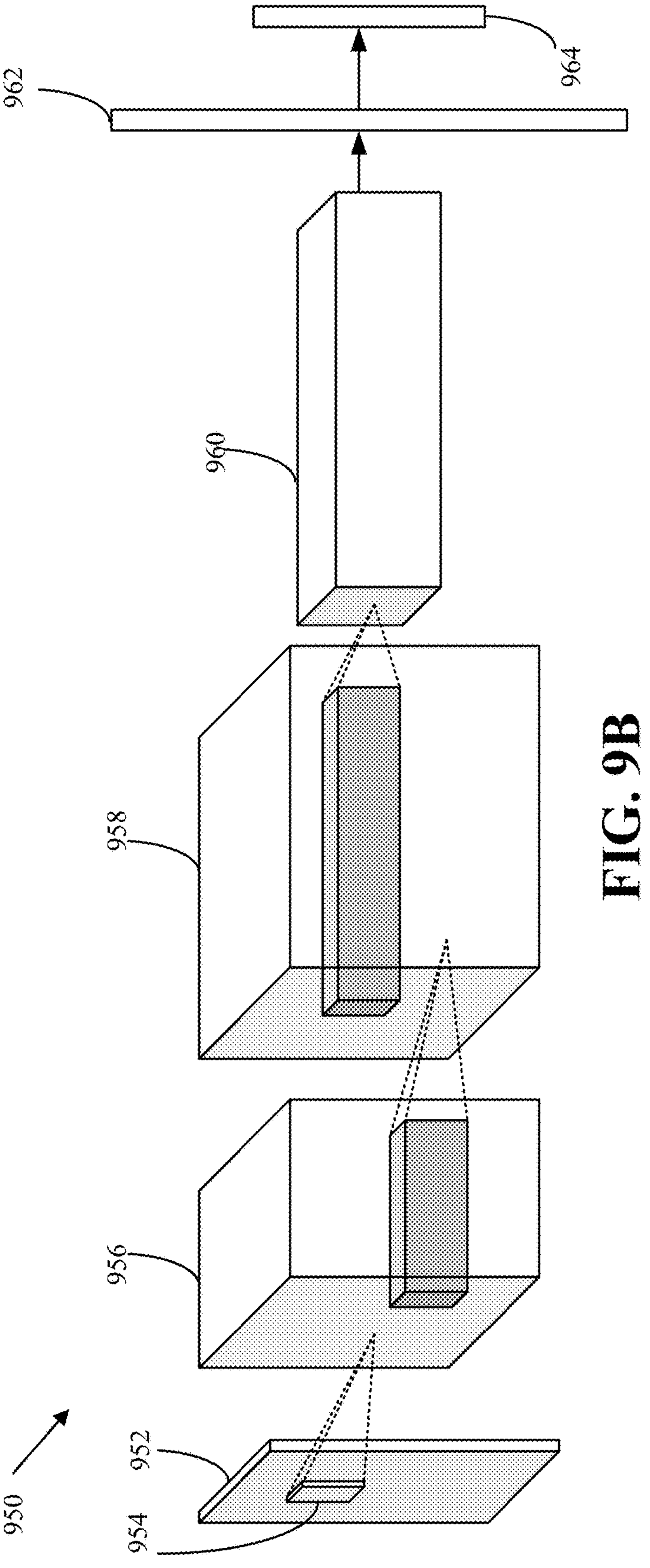

The region-of-interest detector may be a machine-learning model, such as a convolutional neural network, which can be as described with respect to FIGS. 9A-9B. As is known, a crucial prerequisite of the training of a machine-learning model (such as the region-of-interest detector) is to prepare high volumes of labelled training and validation data. A detector of regions-of-interest must be trained on images that include a variety of unpredictably shaped and placed distractors. However, in the case of the region-of-interest detector, and given the infinite possibilities of distractors, it can be infeasible to obtain such training data. For example, it can be too costly to label training data manually at a volume.

Implementations according to this disclosure can automate the process of training data generation for the region-of-interest detector that is a machine-learning model. Training images that include blobs (i.e., randomly generated distractors of varying shapes, sizes, and fillers that are randomly placed over edges or vertices of regions-of-interest) can be generated by implementations of this disclosure. Randomizing the distractors, as described herein, can prevent overfitting, which can be a problem in machine learning. Overfitting refers to the situations where the machine-learning model learns the particulars of the training data rather than learning to generalize from the training data. Using training data generated according to this disclosure can result in a region-of-interest detector that is tolerant to abuses (e.g., distractors as described herein) that may be encountered in real world scenarios.

A region-of-interest detector that is trained using automatically generated randomized blobs that are added to edges or vertices of regions-of-interest in images to generate training data can be tolerant to such transformations (e.g., images that include distractors) in media content and can identify unauthorized content in media files, including media streams. As such, implementations according to this disclosure can result in identifying or preventing violations of laws therewith eliminating or at least minimizing the possibilities that copyright holders may be deprived of their rights.

Details are described herein after first describing an environment that can be improved using the randomly generated blobs to improve object-detection training for framed video content.

FIG. 1 is a high-level block diagram of a system 100 for detecting unauthorized video content. FIG. 1 illustrates a video hosting system 102 and a user device 120 connected by a network 124. A user can use the user device 120 to access videos contained within the video hosting system 102. A user can access a video from the video hosting system 102 by browsing a catalog of videos, conducting searches using keywords, reviewing play lists from other users or a system administrator (e.g., collections of videos forming channels), or viewing videos associated with particular user groups (e.g., communities). Additionally, in some embodiments, the video hosting system 102 can be adapted to receive videos for storage in order to enable the sharing of the videos with other users.

The user device 120 communicates with the video hosting system 102 over the network 124. In one embodiment, the user device 120 can be a personal computer executing a client application, such as a web browser 122 that allows a user to view web pages and videos provided by the video hosting system 102. In another embodiment, the user device 120 can be a mobile device such as a smartphone, a tablet computer, or a personal computer, that executes a software application that provides functionality for accessing the video hosting system 102. The user device 120 may also be another network-capable device such as a vehicle entertainment system, a television "set-top box," etc. Although FIG. 1 illustrates only a single user device 120, it should be understood that many user devices (e.g., millions) can communicate with the video hosting system 102 at any time. Only one user device 120 is illustrated in order to simplify and clarify the present description.

The network 124 represents the communication pathways between the user device 120 and the video hosting system

102. In one embodiment, the network 124 can be the Internet or any type of network, including but not limited to wired or wireless networks, cloud computing networks, private networks, virtual private networks, and any combination thereof. In addition, all or some of networking links can be encrypted using conventional encryption technologies such as the secure sockets layer (SSL), Secure HTTP, and/or virtual private networks (VPNs). In another embodiment, dedicated data communications technologies can be used instead of, or in addition to, the ones described above.

Through the video hosting system 102, users may access video content via searching and/or browsing interfaces (e.g., user interfaces or programmatic interfaces). The sources of videos can be from user uploads of videos, searches or crawls of other websites or databases of videos, or the like, or any combination thereof. The video hosting system 102 can be configured to allow for user uploads of content (e.g., user-generated content (UGC)). The video hosting system 102 can be configured to obtain videos from other sources by crawling such sources or searching such sources in real time.

The video hosting system 102 may be or may be available at a website. The term "website" can represent any computer system adapted to serve content using any internetworking protocols, and is not intended to be limited to content uploaded or downloaded via the Internet or the HTTP protocol. In general, functions described in one embodiment as being performed on the server side can also be performed by the user device 120 in other embodiments, if appropriate. In addition, the functionality attributed to a particular component can be performed by different or multiple components operating together.

The video hosting system 102 can include a front end server 104, an ingest server 106, a video search server 108, a video similarity engine 110, a video access server 112, a video data store 114, and a fingerprint data store 116. Many conventional features, such as firewalls, load balancers, application servers, failover servers, site management tools and so forth are not shown so as not to obscure the features of the system.

The front end server 104 can handle communication with the user device 120 via the network 124. The front end server 104 can receive requests from the user device 120 and communicate with the other servers of the video hosting system 102 in order to process the requests. The front end server 104 can be further configured to monitor client interactions with the video hosting system 102. For example, if a user clicks on a web page, uploads a video, views a video, makes a purchase, or fills a web-based form, the front end server 104 can monitor these interactions. The front end server 104 may be further configured to transmit and present the requested video and related video links to the user device 120 on a webpage. The requested video can be streamed by the front end server 104 to the user device 120. One or more related video links may appear on the webpage where the requested video is playing, such that the related video link can be selected by a user in order to view the related videos.

Any content received via the network 124 from a user device 120 for posting to the video hosting system 102 is passed on to the ingest server 106 for processing. The processing of the video file includes assigning an identifier to the newly received video file. Other steps of processing the video file may include formatting (e.g., transcoding), compressing, metadata tagging, content analysis, and/or other data processing methods. In one embodiment, the user device 120 transmits a form along with the video file transmitted to the video hosting system 102. The user may include in the form information that describes the video (e.g., title, description, and tag information). The form information may also include an indication of the media type, which for uploaded videos would always be the "video" type. The ingest server 106 stores the processed video file in a video data store 114 and stores the information included in the form as metadata of the video file. The video data store 114 is the storage system where the video files transmitted to the video hosting system 102 are stored. A video may be accompanied by icons or thumbnail views, associated metadata, such as title, author, tags, description, comments, and rating. In various embodiments, the ingest server 106 may pass received videos directly to the video similarity engine 110 for analysis.

The video search server 108 can process requests received by the front end server 104 and can identify videos that are relevant to the requests. A request provided by a user via the user device 120 to the front end server 104 may include a search query specifying one or more search terms. The video search server 108 may use the one or more search terms, for example, to query the metadata of video files stored in the video data store 114. The search results can include videos the associated metadata of which may be relevant to at least one or more of the search terms. The search results or a subset thereof may be transmitted to the front end server 104, so that the search results can be presented to the user, such as at the user device 120.

The video access server 112 receives from the front end server 104 requests from users for specific videos. The user may submit a request for a video by browsing the different categories of the video hosting system 102 or by clicking on a link to a video from a search results webpage. The request transmitted by the user device 120 can include the identifier of a video. The video access server 112 can use the identifier to search and locate the video in the video data store 114. The video access server 112 can provide the video requested to the front end server 104, which in turn provides (e.g., streams, etc.) the video to the user device 120.

The video similarity engine 110 can determine if an uploaded video includes video content of one or more other videos, for example, from videos that are copyright protected, access restricted, or are otherwise noteworthy. If the uploaded video is similar to an existing video, the video similarity engine 110 may flag or remove the video from the video hosting system 102, depending upon whatever logic is added to the video similarity engine 110 to process such unauthorized videos. The video similarity engine 110 can process a video simultaneously while it is being uploaded. The video similarity engine 110 can also process a video simultaneously when the ingest server 106 is processing the video.

To determine similarity, the video similarity engine 110 may create one or more fingerprints and one or more sub-fingerprints of a video. In an example, sub-fingerprints can be generated using video content that includes motion. Sub-fingerprints therefore represent a portion of the video content included in a video and can be used to identify whether a given video includes within its frames video content that is wholly or partially copied from another video. The video similarity engine 110 can compare sub-fingerprints to fingerprints stored in a fingerprint data store 116. Upon determining a sub-fingerprint of a video sufficiently matching a fingerprint stored in the fingerprint data store 116 that is derived from another video, the video similarity engine 110 determines that the video includes video content copied from another video. If video is already uploaded to the system, the video may be removed from the video hosting system 102 (e.g., the video data store 114). If the video is still being uploaded, the upload of the video may be terminated. In an example, creating the one or more fingerprints can be as described in U.S. Pat. No. 9,972,060 issued on Mar. 15, 2018 and titled "Detecting multiple parts of a screen to fingerprint to detect abusive uploading videos," the entire disclosure of which in incorporated herein by reference.

The fingerprint data store 116 stores fingerprints derived from a video corresponding to a video file stored in the video data store 114. Fingerprints stored in the fingerprint data store 116 can be used as reference for the video similarity engine 110 to determine whether a video includes video content of one or more other videos.

It should be appreciated that the data processing operations of the video similarity engine 110, as described herein, inherently require a programmed computer system for their practical implementation. To simplify and clarify the present description, the content received and shared by the video hosting system 102 is generally referred to as videos, video files, or video items, as appropriate for the video-specific embodiments described herein, but it should be understood that the video hosting system 102 can receive and share content of any media type that includes pictures of moving content such as 360 degree videos, 3D videos, etc., virtual or augmented reality content, etc.

Figure 2:
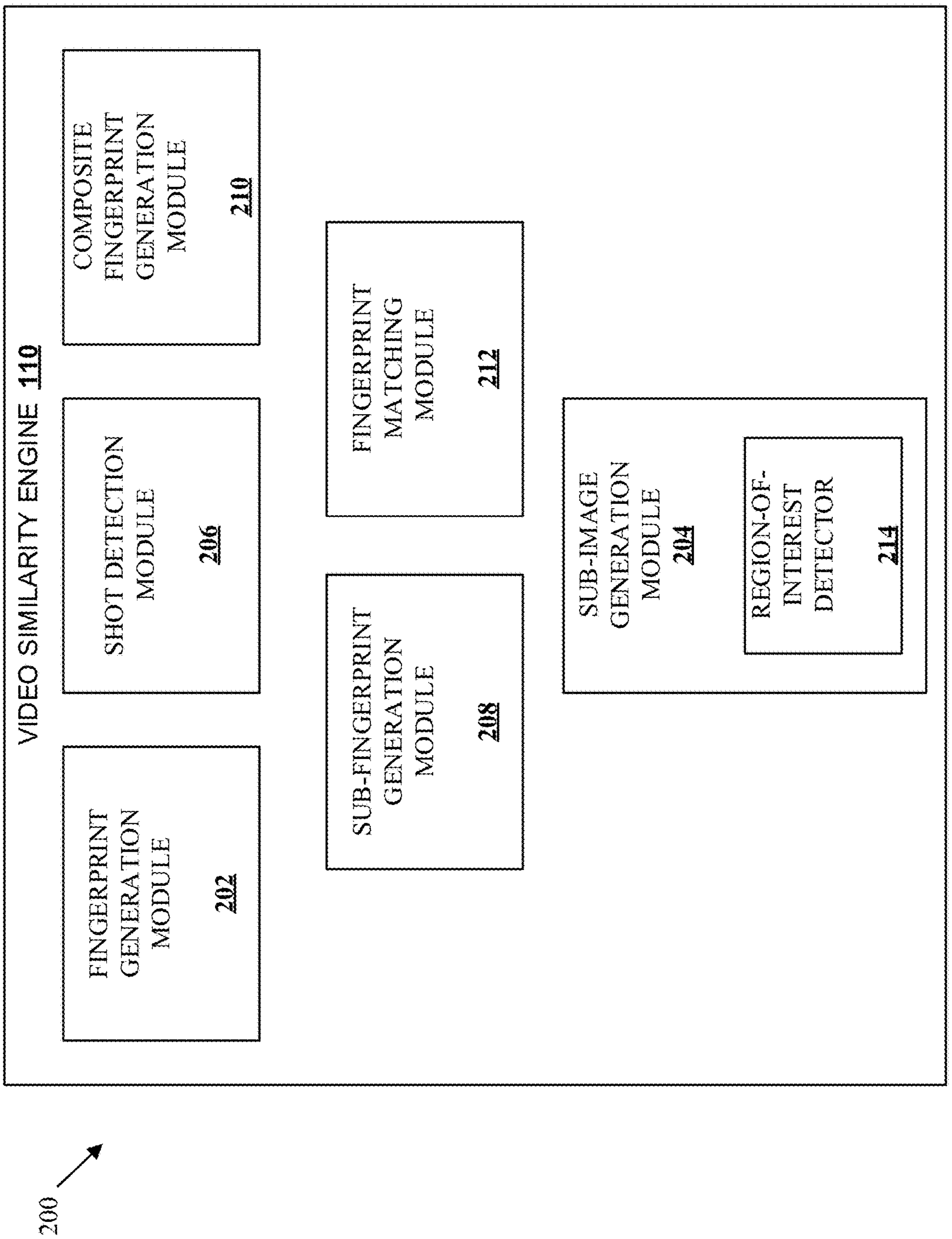
FIG. 2 is a high-level block diagram illustrating a detailed view of the video similarity engine.

FIG. 2 is a high-level block diagram 200 illustrating a detailed view of the video similarity engine 110. As shown in FIG. 2, the video similarity engine 110 includes several modules. Those of skill in the art will recognize that other embodiments can have different modules than the ones described here, and that the functionalities can be distributed among the modules in a different manner. In addition, the functions ascribed to the video similarity engine 110 can be performed by multiple engines. As illustrated, the video similarity engine 110 includes a fingerprint generation module 202, a sub-image generation module 204, a shot detection module 206, a sub-fingerprint generation module 208, a composite fingerprint generation module 210, and a fingerprint matching module 212.

The fingerprint generation module 202 generates fingerprints for a video. The fingerprint generation module 202 generates fingerprints for time intervals of a video using video frames of the video. A fingerprint can be generated based on a video frame or an uninterrupted sequence of video frames that have continuity in image content. As an example, a fingerprint may be represented as a bit vector representing, for example, the spatial, temporal, and/or structural characteristics of a video frame. The fingerprint identifies a video frame based on its visual content such that minor variations due to compression, de-compression, noise, frame rate, start and stop time, source resolutions and the like do not significantly affect the fingerprint. The fingerprint generation module 202 may receive a video from the front end server 104, from the ingest server 106, or from the video data store 114. In some embodiments, the fingerprint generation module 202 generates fingerprints for a video simultaneously when the ingest server 106 processes the video.

The sub-image generation module 204 generates sub-images using video frames of a video. A sub-image of a video frame includes image content of the video frame that includes motion. Video content that includes motion which is embedded within a static or semi-static frame or image is assumed to be more likely to include unauthorized content relative to a more standard video. As used herein, video content refers to visual content of a video and image content refers to the visual content of a single video frame of the video. The sub-image generation module 204 identifies video content that includes motion and corresponding regions of individual video frames.

The sub-image generation module 204 extracts the image content (e.g., pixels and associated color values) of the identified regions from individual video frames to create sub-images. When a video includes unauthorized video content of another video as well as additional "disguising" content (such as a frame or static image), sub-images of the video are generated to include the unauthorized video content excluding the disguising content. Sub-images of a video are used to generate sub-fingerprints that are used to detect whether the video includes unauthorized content of another video.

As an example, a video may include video content from another video and a background image that may stays substantially or entirely the same between frames. For each of a sequence of video frames, the sub-image generation module 204 may generate a sub-image (i.e., a region-of-interest) corresponding to each video frame, where the sub-image (i.e., the region-of-interest) includes the region of each frame where the other video's content is depicted. As another example, a video may include video content from two different videos. The sub-image generation module 204 may generate separate sub-images (i.e., regions-of-interest) corresponding to a video frame of a first video and to a video frame of a second video.

To identify content for inclusion in sub-images, the sub-image generation module 204 may include a region-of-interest detector 214. The region-of-interest detector 214 can detect respective edges of the sub-images (i.e., regions-of-interest). For example, the region-of-interest detector 214 can identify one or more boxes within a frame that may include unauthorized video content. That is, the region-of-interest detector 214 can identify the regions-of-interest within frames. In an example, the region-of-interest detector 214 can identify the regions-of-interest with likelihood values.

To illustrate, the region-of-interest detector 214 may identify that within a certain frame, boxes defined by the opposing corners with the coordinate tuples $((x_{11},y_{11}), (x_{12}, y_{12}) ((x_{21},y_{21}), (x_{22},y_{22})), ((x_{31},y_{31}), (x_{32},y_{32}))$, and $((x_{41}, y_{41}), (x_{42},y_{42}))$ are identified as being regions-of-interest with respective probabilities of 20%, 90%, 5%, and 30%. In an example, the region-of-interest detector 214 may output the region of interest with the highest probability. In an example, the region-of-interest detector 214 may not output regions-of-interest having probabilities below a minimum probability (e.g., 60% or some other probability). In an example, the region-of-interest detector 214 outputs a maximum preset number (e.g., 5 or some other number) of regions-of-interest.

As further described herein, the region-of-interest detector 214 can identify a region-of-interest in a frame that may include distractors. In an example, the region-of-interest detector 214 can be a machine-learning model. In an example, the region-of-interest detector 214 can be a convolutional neural network (CNN), such as described with respect to FIGS. 9A and 9B.

Figure 3:
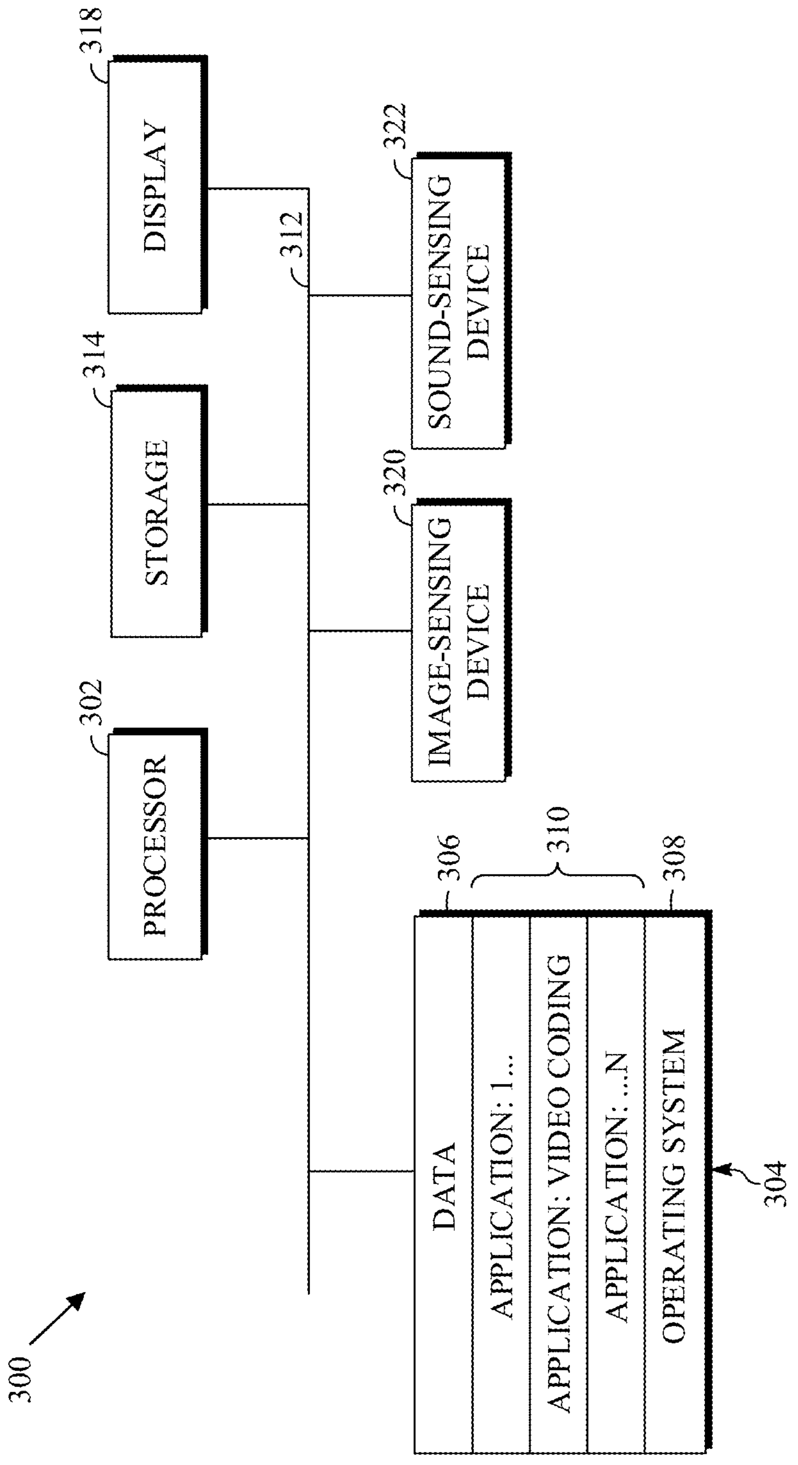
FIG. 3 is a block diagram of an example of a computing device.

FIG. 3 is a block diagram of an example of a computing device 300 that can implement one or more components of the video hosting system 102 or the user device 120 of FIG. 1. The computing device 300 can implement a computing device for generating training data of a region-of-interest detector, such as the region-of-interest detector 214 of FIG. 2. The computing device 300 can be in the form of a computing system including multiple computing devices, or in the form of a single computing device, for example, a mobile phone, a tablet computer, a laptop computer, a notebook computer, a desktop computer, and the like.

A CPU 302 in the computing device 300 can be a central processing unit. Alternatively, the CPU 302 can be any other type of device, or multiple devices, capable of manipulating or processing information now-existing or hereafter developed. Although the disclosed implementations can be practiced with a single processor as shown, e.g., the CPU 302, advantages in speed and efficiency can be achieved using more than one processor.

A memory 304 in the computing device 300 can be a read-only memory (ROM) device or a random access memory (RAM) device in an implementation. Any other suitable type of storage device can be used as the memory 304. The memory 304 can include code and data 306 that is accessed by the CPU 302 using a bus 312. The memory 304 can further include an operating system 308 and application programs 310, the application programs 310 including at least one program that permits the CPU 302 to perform the methods described here. For example, the application programs 310 can include applications 1 through N, which further include an application that performs the methods described here, such as an application to generate training images including randomly generate blobs for training a region-of-interest detector. The computing device 300 can also include a secondary storage 314, which can, for example, be a memory card used with a computing device 300 that is mobile.

The computing device 300 can also include one or more output devices, such as a display 318. The display 318 may be, in one example, a touch sensitive display that combines a display with a touch sensitive element that is operable to sense touch inputs. The display 318 can be coupled to the CPU 302 via the bus 312. Other output devices that permit a user to program or otherwise use the computing device 300 can be provided in addition to or as an alternative to the display 318. When the output device is or includes a display, the display can be implemented in various ways, including by a liquid crystal display (LCD), a cathode-ray tube (CRT) display or light emitting diode (LED) display, such as an organic LED (OLED) display.

The computing device 300 can also include or be in communication with an image-sensing device 320, for example a camera, or any other image-sensing device 320 now existing or hereafter developed that can sense an image such as the image of a user operating the computing device 300. The image-sensing device 320 can be positioned such that it is directed toward the user operating the computing device 300. In an example, the position and optical axis of the image-sensing device 320 can be configured such that the field of vision includes an area that is directly adjacent to the display 318 and from which the display 318 is visible.

The computing device 300 can also include or be in communication with a sound-sensing device 322, for example a microphone, or any other sound-sensing device now existing or hereafter developed that can sense sounds near the computing device 300. The sound-sensing device 322 can be positioned such that it is directed toward the user operating the computing device 300 and can be configured to receive sounds, for example, speech or other utterances, made by the user while the user operates the computing device 300.

Although FIG. 3 depicts the CPU 302 and the memory 304 of the computing device 300 as being integrated into a single unit, other configurations can be utilized. The operations of the CPU 302 can be distributed across multiple machines (each machine having one or more processors) that can be coupled directly or across a local area or other network. The memory 304 can be distributed across multiple machines such as a network-based memory or memory in multiple machines performing the operations of the computing device 300. Although depicted here as a single bus, the bus 312 of the computing device 300 can be composed of multiple buses. Further, the secondary storage 314 can be directly coupled to the other components of the computing device 300 or can be accessed via a network and can comprise a single integrated unit such as a memory card or multiple units such as multiple memory cards. The computing device 300 can thus be implemented in a wide variety of configurations.

Figure 4:
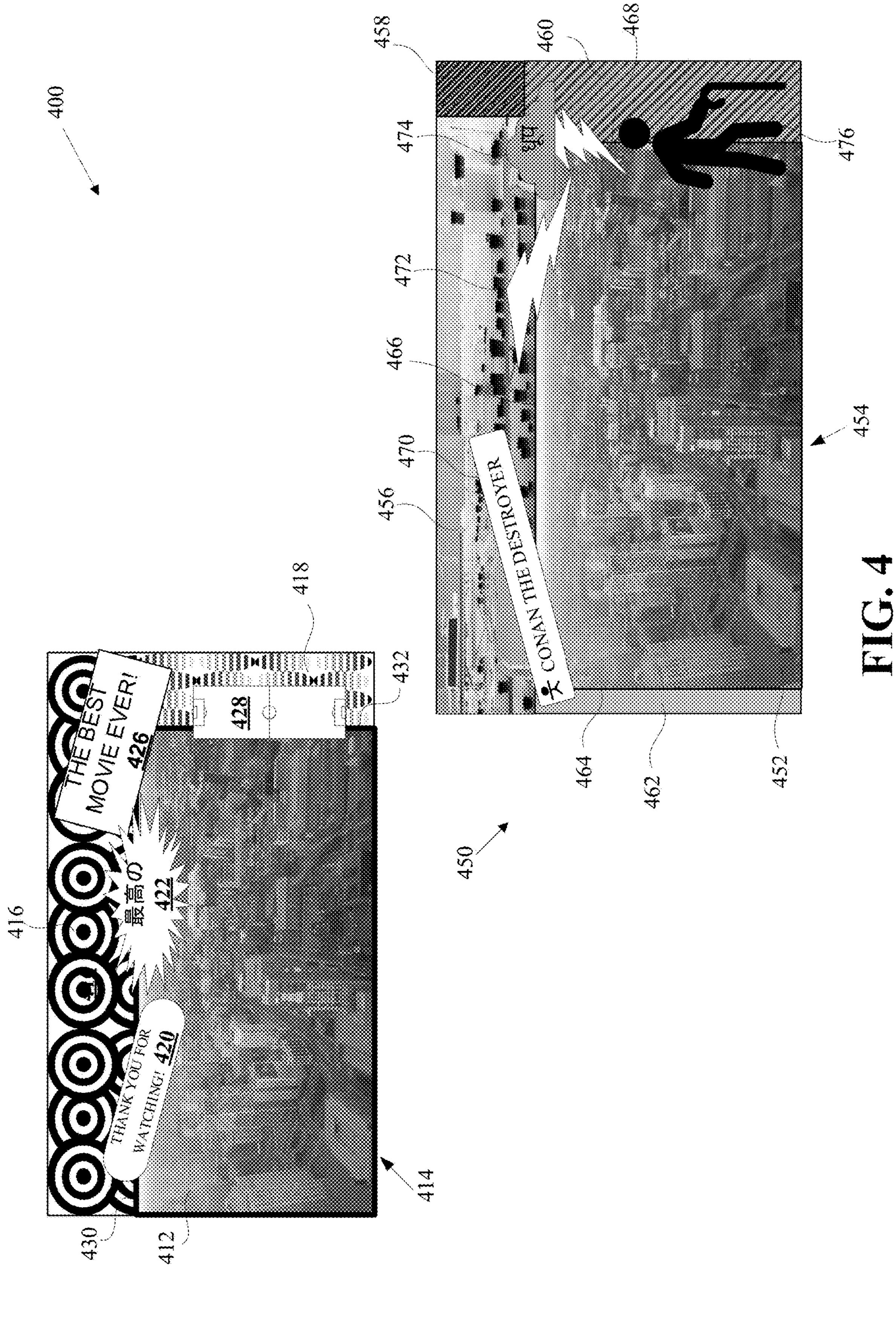
FIG. 4 illustrates examples 400 of frames that include distractors.

FIG. 4 illustrates examples 400 of frames that include distractors. A first frame 410 may be a stand-alone image or may be a frame of a video. The first frame 410 includes a region-of-interest 414 within which media content 412 may be displayed or played. The background of the first frame 410 includes a pattern 416 that covers the top of the first frame 410 and a second pattern 418 that covers the remaining right side of the first frame 410.

The contour of the region-of-interest 414, which includes a top edge 430 and a right edge 432, is shown as a thick black line so as to highlight the region-of-interest 414 and make it easily identifiable for purposes of this description. However, in other frames according to implementations of this disclosure, the region-of-interest may not be surrounded by an explicit border at all or may be surrounded by a thicker or thinner border than that shown in the first frame 410. In some examples, the edges of the region-of-interest (i.e., the edges of the media content) may blur into the background of the frame or the region-of-interest may abruptly transition into the background.

Distractors 420, 422, 426, and 428 are overlayed over the frame such that a respective portion of each of the distractors covers (e.g., overlays, obscures, etc.) a respective portion of the region-of-interest 414, and another respective portion of each of the distractors covers (e.g., overlays, obscures, etc.) a respective portion of the background of the first frame 410. As such, a distractor covers at least a portion of at least one edge of the region-of-interest 414. For example, the distractors 420, 414 and 426 overlay and partially cover respective parts of the top edge 430; and the distractors 426 and 428 overlay and partially cover respective parts of the right edge 432. Additionally, the distractor 426 covers the top-right vertex (corner) of the region-of-interest 414.

The distractor 420 has an oblong shape, has a diagonal orientation, and includes the English text "THANK YOU FOR WATCHING." The distractor 422 has a burst shape and includes Japanese text that translates to "THE BEST." The distractor 426 is a diagonally oriented rectangle that includes the English text "THE BEST MOVIE EVER!" The distractor 428 is an image of soccer field.

The second frame 450 may be a stand-alone image or may be a frame of a video. The second frame 450 includes a region-of-interest 454 within which media content 452 may be displayed or played. The background of the second frame 450 includes an image 456 that covers a substantial portion the top of the second frame 450, a first pattern 458 that covers the remaining part of the top of the second frame 450, a second pattern 460 that covers a portion of the right side of the second frame 450 that is not covered by the first pattern 458, and a solid pattern 462 that covers a portion of the left side of the second frame 450 that is not covered by the image 456.

The contour of the region-of-interest 454 includes a left edge 464, a top edge 466, and a right edge 468. The second frame 450 includes distractors 470, 472, 474, and 476. The distractor 470 is a rectangle with rounded edges, includes a stick figure and the text "CONAN THE DESTROYER," and covers a portion of the left edge 464, a portion of the top edge 466, and the top-left vertex of the region-of-interest 454. The distractor 472 has the shape of a lightning bolt and overlays a portion the top edge 466 of the second frame 450. The distractor 474 has the shape of a cloud and a lightning bolt, includes Hindi text that translates to the English text "SUNNY," and covers a portion of the top edge 466, a portion of the right edge 468, and the top-right vertex of the region-of-interest 454. The distractor 476 is an outline of a person walking with a cane, and covers a portion of the right edge 468 of the region-of-interest 454.

As can be appreciated from the examples 400 of FIG. 4, the distractors that may be used to overlay edges of a region-of-interest (i.e., an area of a frame where unauthorized content may be displayed or played) can have any shape, include any content, have any orientation, overlay any portion or any edge of the region-of-interest, cover any vertex of the region-of-interest, and so on. The distractors can include icons, superhero characters, images of real persons, buildings, space ships, planets, test, and on and on and on. The possibilities are infinite.

Figure 5:
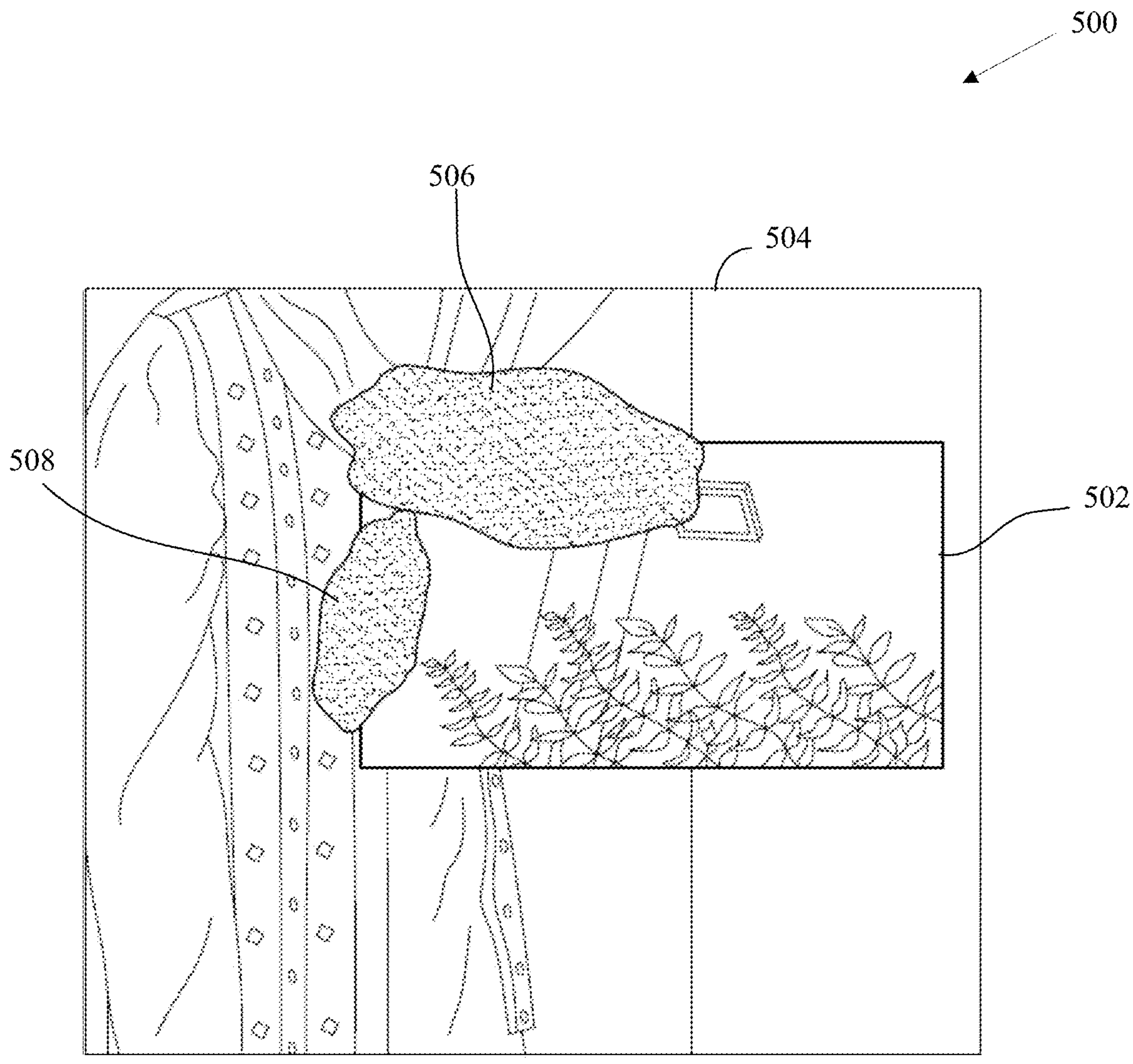
FIG. 5 is an example of a training image that is generated according to implementations of this disclosure.

FIG. 5 is an example of a training image 500 that is generated according to implementations of this disclosure. The training image 500 includes a region-of-interest 502 that is within a frame 504. A blob 506 and a blob 508 are generated as described herein and randomly placed over edges or vertices of the region-of-interest 502 as also described herein.

Figure 6:
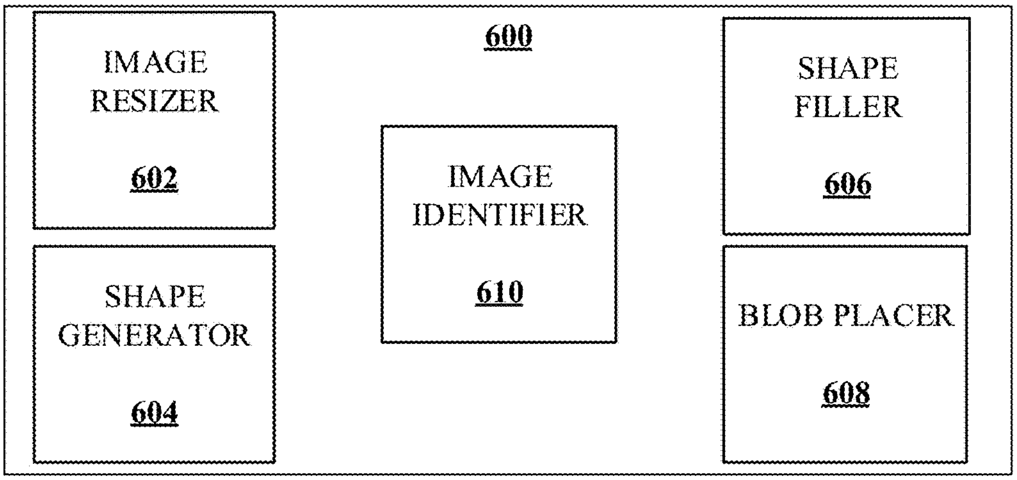
FIG. 6 is block diagram of an example of a system 600 for generating training images according to implementations of this disclosure.

FIG. 6 is block diagram of an example of a system 600 for generating training images according to implementations of this disclosure. The system 600 can include an image resizer module 602, a shape generator module 604, a shape filler module 606, and a blob placer module 608. Other implementations of the system 600 as shown in FIG. 6 are available. In some implementations, additional modules can be added, certain modules can be combined, and/or certain modules can be removed.

At least some (e.g., each of) of the modules 602-608 can be implemented, for example, as software programs that may be executed by a computing device, such as the computing device 300 of FIG. 3. The software programs can include machine-readable instructions that may be stored in a memory such as the memory 304 of FIG. 3, and that, when executed by a processor, such the CPU 302 of FIG. 3, may cause the computing device to perform the functions of the respective modules. The at least some of the modules of the system 600 may be implemented using specialized hardware or firmware. Multiple processors, memories, or both, may be used.

In an example, the system 600 can include an image identifying module 610. An image (e.g., frame) identified by the image identifying module 610 includes a region-of-interest that is as described here. As used in this disclosure, "identify" can mean to receive, create, form, produce, select, construct, determine, specify, generate, choose, or other identify in any manner whatsoever.

In an example, the image identifying module 610 can receive a video comprised of frames and the can select one of the frames as the image. Frames may be selected at a certain frequency from the video. For example, a frame may be selected every 150 milliseconds. For example, every twentieth frame may be selected. Each of the selected frames can be an identified image to which blobs are added as described herein. The image identifying module 610 can also receive, for a received image, an indication of a location of the region-of-interest. In an example, the image identifying module 610 can receive a pixel location (e.g., Cartesian coordinates) of a vertex (e.g., one of the corners) of the region-of-interest and width and height of the region-of-interest. In an example, the image identifying module 610 can receive pixel locations of two vertices of the region-of-interest.

In another example, the image identifying module 610 can generate the image. For example, the image identifying module 610 can obtain a random image and can embed a frame of a video inside the image at a location of the random image. The location can be randomly selected.

The image resizer module 602 can resize the image to a predefined size. The image resizer module 602 can normalize the image (and all identified images) into a standard size. Normalizing the images to a standard size can be used so that a same (e.g., standard) coordinate system can be used for all images, such as for identifying locations of regions-of-interest and/or for sizing and placing blobs.

The shape generator module 604 can generate one or more shapes. Other modules of the system 600 can convert the shapes into blobs, which are overlayed on the frame, as further described herein. In an example, the number (e.g., cardinality) of the one or more shapes to be generated can be fixed to a predetermined number of shapes (e.g., 1, 2, 3, or some other number of shapes). In an example, the number (e.g., cardinality) of the one or more shapes to be generated can be randomized. The number of shapes to be generated by the shape generator module 604 can be according to random number that is between 1 and a maximum number of shapes (e.g., 1, 2, 3, 4, or some other maximum number of shapes).

In an example, a shape can be generated using a randomized Fourier series. As is known, Fourier series can be used to obtain epicycle-based periodic (e.g., closed) shapes. Epicycles can be described as circles moving (e.g., rotating) within circles, which are rotating within other circles, and so on. A point rotating along the inner most circle can be thought of as a pencil that traces the shape. The Fourier series can have many forms.

The Fourier series can be expressed as a sum of sine and cosine waves. As is known, the Fourier series of a function $f(x)$ can be given by equation (1).

$$f_N(x) = \frac{a_0}{2} + \sum_{n=1}^{N}\left(a_n\cos\left(\frac{2\pi}{P}nx\right) + b_n\sin\left(\frac{2\pi}{P}nx\right)\right) \tag{1}$$

In equation (1), N is the number of sine and cosine waves; P is the period, the $n^{th}$ harmonics are $$\cos\left(\frac{2\pi}{P}nx\right) \text{ and } \sin\left(\frac{2\pi}{P}nx\right);$$

the Fourier coefficients $a_n$ and $b_n$ are defined as integrals in terms of the function $f(x)$ and are the amplitudes (e.g., weights) of the respective harmonics; $a_0$ is the amplitude of the zero frequency (i.e., D.C.) component.

Obtaining the randomized Fourier series can include randomizing at least one of the period (P), the number (N) of the sine and cosine coefficients, the values of the Fourier coefficients ($a_n$ and $b_n$), the amplitude of the zero frequency ($a_0$), other parameters, or a combination thereof. It is noted that randomizing the amplitudes amounts to randomizing the radii of the respective epicycles.

In another example, the exponential form of the Fourier series can be used. The exponential form may be given by equation (2), where t ranges from 0 to 2π and P is the period.

$$s_N(t) = \sum_{n=-N}^{N} c_n e^{i\frac{2\pi}{P}nt} \quad (2)$$

Obtaining a randomized Fourier series of equation (2) can include randomizing at least one of the period (P), the number (N), the coefficients $c_n$, other parameters, or a combinations thereof.

Figure 7:
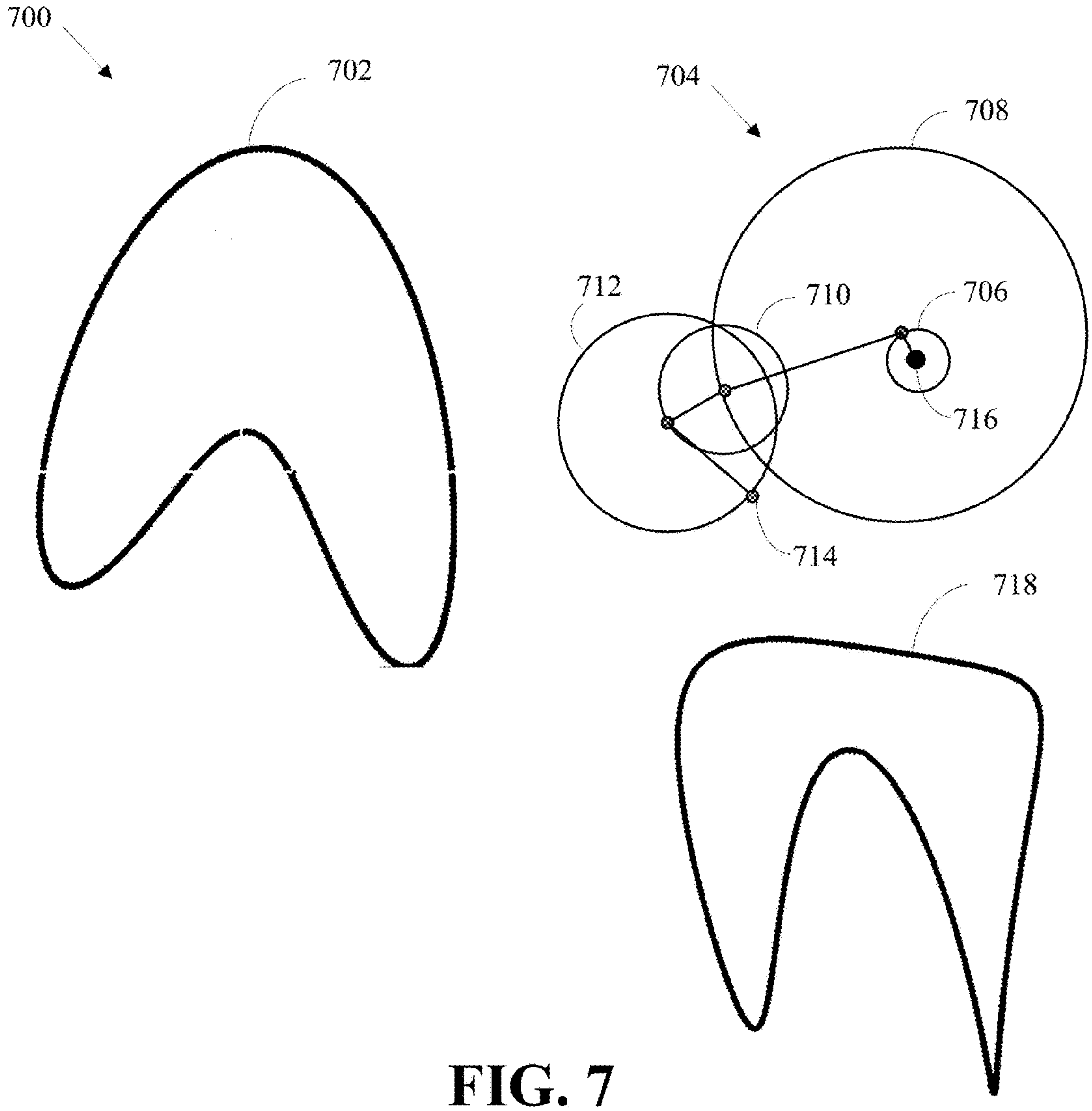
FIG. 7 illustrates an example 700 of shapes that are obtained using a random Fourier series.

FIG. 7 illustrates an example 700 of shapes that are obtained using a random Fourier series. A shape 702 is obtained using the exponential form with N=2, P=2π, and the coefficients $c_n$ are as shown in equation (3).

$$s(t)=(10.72+16.52i)+(-12.64+20.900e^{1it}+(-135.66-45.570e^{-1it}+(-44.85-23.710e^{2it}+(66.75-53.070e^{-2it} \quad (3)$$

A tracer 704 illustrates the epicycles used to obtain the shape 702. That is the shape 702 can be obtained as the sum of the individual circular motions of epicycles 708-712. The epicycle 706 corresponds to the sum $(-12.64+20.90i)e^{1it}$ of equation (3); the epicycle 708 corresponds to the sum $(-135.66-45.57i)e^{-1it}$ of equation (3); the epicycle 710 corresponds to the sum $(-44.85-23.710e^{2it}$ of equation (3); and the epicycle 712 corresponds to the sum $(66.75-53.07i)e^{-2it}$ of equation (3). The sum (10.72+16.52i) represents an anchor point 716 and corresponds to n=0. The shape 702 is drawn by a point 714 of the epicycle 712, which corresponds to n=2.

A shape 718 is another example of a shape that is obtained using the exponential form with N=3 and P=2π. The coefficients $c_n$ are omitted.

Returning to FIG. 6, other techniques of obtaining the shapes are possible.

In an example, the shape generator module 604 can randomly select the shape from an available list of geometric shapes. For example, the available list of geometric shapes can include one or more of a rectangle, a square, a triangle, a rhombus, a parallelogram, a trapezoid, a trapezium, a convex hexagon, a concave hexagon, a convex pentagon, a concave pentagon, fewer shapes, other multi-sided shapes, or a combination thereof. A size of the shape can also be randomly generated. For example, the size of the generated shape can be a random proportion of the shape of the region-of-interest with a minimal size (e.g., 10% of the width or height of the region-of-interest) and maximal size (e.g., 50% of the width or height of the region-of-interest).

In another example, the shape generator module 604 can generate the shape from a random set of connected points in space. For example, shape generator module 604 can generate random points (e.g., random Cartesian coordinates) to be within a selected geometric shape (e.g., a circle, an ellipse, or another shape) with predefined dimensions. In an example, the shape generator module 604 can form (e.g., obtain, calculate, etc.) the convex hull of the points. The shape generator module 604 can ignore (e.g., not include in the shape) any points that do not fall on (i.e., the points that are within) the convex hull.

Any combination of the foregoing techniques of generating shapes or other techniques can be used to obtain shapes. In an example, a plurality of techniques for generating shapes are possible and one of the techniques can be randomly selected for obtaining a shape. To illustrate, in the case of generating two shapes, in an implementation, the first shape can be generated using a randomly selected first technique and the second shape can be generated using a randomly selected second technique, which may be the same as the first technique depending on the random selection.

The shape filler module 606 can fill the shape with a filler. The shape filler module 606 can use image processing techniques to fill the shape with a filler. A shape that is output by the shape filler module 606 is referred to as a blob. That is, a blob is a filled shape.

In an example, several filler types can be available and the shape filler module 606 can randomly select a filler type from the available filler types. The shape filler module 606 can set the shape to be transparent, opaque, or semi-transparent. In an example, the available filler types can include random text strings in different languages, random noise, an image, a solid (e.g., single, uniform, etc.) color, a gradient color, a pattern, more filler types, fewer filler types, or a combination thereof. In an example, filler types can be combined by the shape filler module 606. As such, and as a non-limiting example, a shape may be filled with a solid color overlayed with Korean text. In an example, the shape filler module 606 may divide (e.g., logically divide) the shape into sub-shapes and select a filler type for each sub-shape.

For example, with respect to the random text strings filler type, the shape filler module 606 can randomly select a language from a list of available languages and randomly select text as a set of words from a dictionary of the selected language. The shape filler module 606 can randomly select a font size, a font color, or a font type for drawing the text inside the shape.

For example, with respect to the patterns, an available set of hatching patterns can be available and the shape filler module 606 can randomly select a pattern. With respect to the solid color filler type, the shape filler module 606 can randomly select a color and fill the shape with the color. For example, in the case of the RGB color space where each color component may be represented by an 8-bit value, the shape filler module 606 can randomly select a red value, a green, and a blue value where each of the values is in the range [minimum value, maximum value] (e.g., [0, 255]).

In the case of the image filler type, the shape filler module 606 can have access to a store of images. The store of images can be a folder of images, a library, such as a publicly available online image library, or some other store of images. The shape filler module 606 can obtain a random image from the store of images. The shape filler module 606 can overlay the shape over a random area of the image to fill the shape with that area of the image. In another example, the shape filler module 606 can shrink or stretch the whole image to fit within the shape.

In the case of the random noise filler type, the shape filler module 606 can use any technique to fill the shape with the random noise. In an example, a polygon fill algorithm can be used. For example, to fill the shape, the shape filler module 606 can find intersections of a scan line (a left-to-right scan line that can be moved top-to-bottom of the shape) with all edges of the polygon; sort the intersection points by, e.g., increasing x-coordinates; and fill in all pixels between pairs of intersections that lie interior to the polygon. A parity can be used, such as an odd-parity rule, to determine whether a point is inside the shape. Each intersection point encountered along a scan line can flip (e.g., change the value of) a parity bit. The shape filler module 606 can draw a pixel value when the parity bit is odd and doesn't draw when the parity bit is even. The parity bit can be initially set to even for a scan line. Drawing a pixel can mean to generate a random pixel value (e.g., respective random red, green, and blue values) for the pixel. In another example, flood fill can be used. A point (i.e., a pixel) inside the shape can be selected and the shape filler module 606 can crawl to neighboring pixels in each direction until all crawlers encounter boundaries of the shape. The shape filler module 606 can set a random color value for each of the encountered pixels.

The blob placer module 608 can randomly place the blob over at least one edge or a vertex of the region-of-interest. Placing the blob on the vertex necessarily causes the blob to be placed on the two edges that form the vertex. In an example, the blob placer module 608 can randomly select a site for the blob. The site can be one of the edges (e.g., top, right, bottom, or left) or a vertex (e.g., top-left, top-right, bottom-right, bottom-left). In the case that the site is an edge, the blob placer module 608 randomly selects a location (e.g., a point) along the edge. The blob placer module 608 can select an offset from the location or vertex to place the centroid of the blob at. The offset can be randomly selected to be within a range of offset pixels. In an example, the range can be [−10, +10] pixels. However, other ranges are possible. The blob placer module 608 can also randomly select an orientation for the shape. The blob placer module 608 can overlay the blob over the frame such that the centroid of the blob coincides with the location of the offset in the frame.

Figure 8:
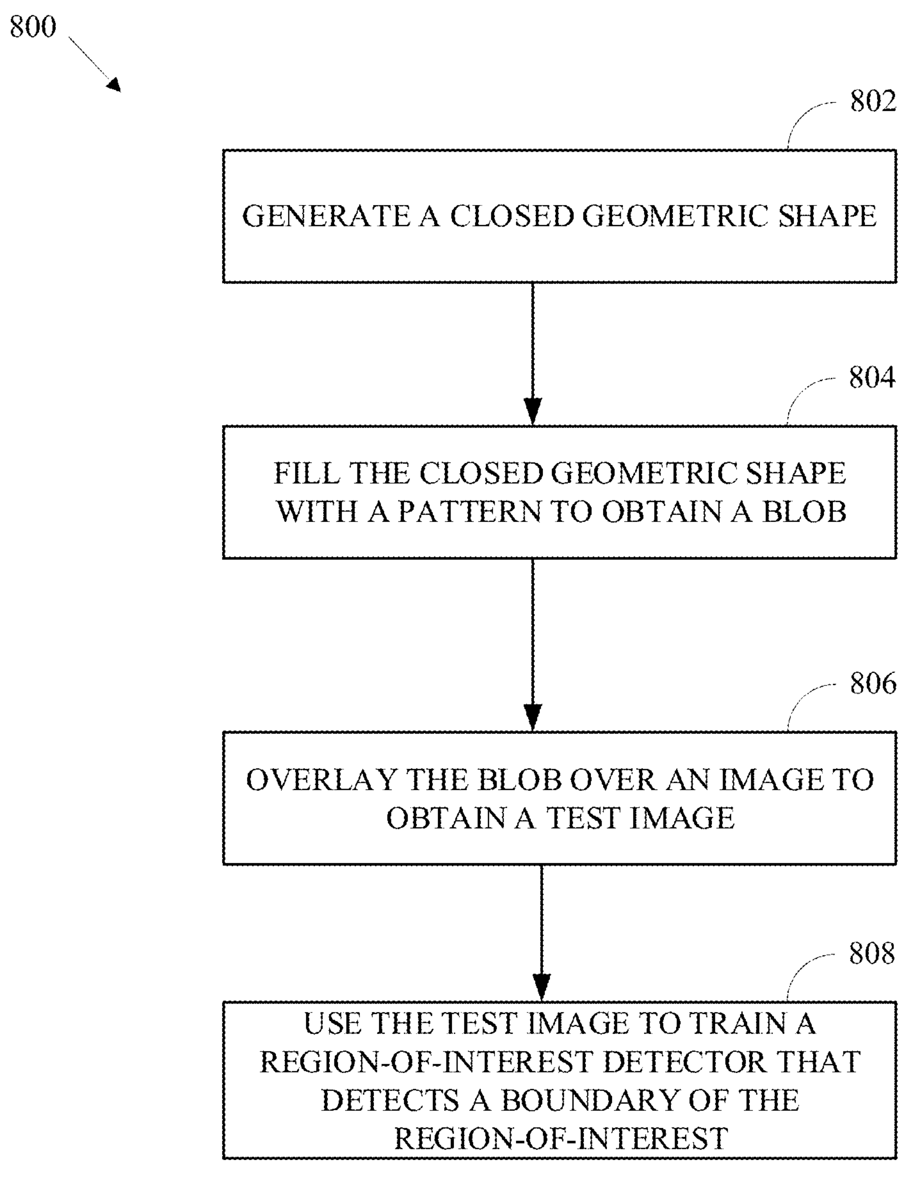
FIG. 8 is a flowchart of an example of a technique for generating a training image for use in training a region-of-interest detector.

FIG. 8 is a flowchart of an example of a technique 800 for generating a training image for use in training a region-of-interest detector. The technique 800 can be implemented, for example, as a software program that may be executed by computing devices, such as the computing device 300 of FIG. 3. The software program can include machine-readable instructions that may be stored in a memory such as the memory 304 or the secondary storage 314, and that, when executed by a processor, such as CPU 302, may cause the computing device to perform the technique 800. The technique 800 can generate training images of a region-of-interest detector, such as the region-of-interest detector 214 of FIG. 2. The technique 800 can be implemented using specialized hardware or firmware. Multiple processors, memories, or both, may be used.

At 802, the technique 800 generates a closed geometric shape. In an example, generating the closed geometric shape can be as described with respect to the shape generator module 604 of FIG. 6. As such, in an example, generating a closed geometric shape can include obtaining the closed geometric shape using a Fourier series. Obtaining the closed geometric shape using a Fourier series can include obtaining the closed geometric shape using a random number of sine waves or random amplitudes of the Fourier coefficients.

At 804, the technique 800 fills the closed geometric shape with a filler to obtain a blob. Obtaining the blob can be as described with respect to the shape filler module 606 of FIG. 6. In an example, the filler can be random noise. In an example, the filler can be an uniform (e.g., solid) color. In an example, the filler can be a filler image.

At 806, the technique 800 overlays the blob on an edge of an image to obtain the training image. As described below, the image can include a region-of-interest and a background region and the edge separates the region-of-interest from the background region. Overlaying the blob on an edge of the image can be as described with respect to the blob placer module 608 of FIG. 6. In an example, the blob can be overlaid on a vertex of the region-of-interest.

At 808, the technique 800 uses the training image to train the region-of-interest detector to detect a boundary of the region-of-interest. In the training phase of the region-of-interest detector, the training image and a first indication of coordinates of the region-of-interest in the training image can be used as inputs to the region-of-interest detector. In an example, the first indication of coordinates can be the coordinates of opposing vertices of the image. In an example, the first indication of coordinates can be the coordinates of a vertex and the width and height of the region-of-interest. More generally, the first indication of coordinates can be any information that the can be used to determine a size and a location of the region-of-interest within the training image.

The region-of-interest detector is trained to output a second indication of an area of the training image and a probability of the area of the training image being the region-of-interest. The second indication of the area of the training image can be any information that can be used to determine a size and a location of area within the training image.

As mentioned above, a region-of-interest detector can be a convolution neural network. FIGS. 9A-9B are block diagrams of examples 900 and 950 of convolutional neural networks (CNNs) for mode decisions.

FIG. 9A illustrates a high level block diagram of an example 900 of a typical CNN network, or simply a CNN. As mentioned above, a CNN is an example of a machine-learning model. In a CNN, a feature extraction portion typically includes a set of convolutional operations, which is typically a series of filters that are used to filter an input signal based on a filter. For example, and in the context of region-of-interest detection, these filters can be used to identify salient features of an image that are useful in identifying the region-of-interest. As the number of stacked convolutional operations increases, later convolutional operations can find higher-level features.

In a CNN, a classification portion is typically a set of fully connected (FC) layers, which may also be referred to as dense operations. The fully connected layers can be thought of as looking at all the input features of an input image in order to generate a high-level classifier. Several stages (e.g., a series) of high-level classifiers eventually generate the desired classification output.

As mentioned, a typical CNN network is composed of a number of convolutional operations (e.g., the feature-extraction portion) which may be followed by a number of fully connected layers. The number of operations of each type and their respective sizes is typically determined during the training phase of the machine learning. As a person skilled in the art recognizes, additional layers and/or operations can be included in each portion. For example, combinations of Pooling, MaxPooling, Dropout, Activation, Normalization, BatchNormalization, and other operations can be grouped with convolution operations (i.e., in the features-extraction portion) and/or the fully connected operation (i.e., in the classification portion). The fully connected layers may be referred to as Dense operations. As a person skilled in the art recognizes, a convolution operation can use a SeparableConvolution2D or Convolution2D operation.

As used in this disclosure, a convolution layer can be a group of operations starting with a Convolution2D or SeparableConvolution2D operation followed by zero or more operations (e.g., Pooling, Dropout, Activation, Normalization, BatchNormalization, other operations, or a combination thereof), until another convolutional layer, a Dense operation, or the output of the CNN is reached. Similarly, a Dense layer can be a group of operations or layers starting with a Dense operation (i.e., a fully connected layer) followed by zero or more operations (e.g., Pooling, Dropout, Activation, Normalization, BatchNormalization, other operations, or a combination thereof) until another convolution layer, another Dense layer, or the output of the network is reached. The boundary between feature extraction based on convolutional networks and a feature classification using Dense operations can be marked by a Flatten operation, which flattens the multidimensional matrix from the feature extraction into a vector.

In a typical CNN, each of the convolution layers may consist of a set of filters. While a filter is applied to a subset of the input data at a time, the filter is applied across the full input, such as by sweeping over the input. The operations performed by this layer are typically linear/matrix multiplications. The output of the convolution filter may be further filtered using an activation function. The activation function may be a linear function or non-linear function (e.g., a sigmoid function, an arcTan function, a tanH function, a ReLu function, or the like).

Each of the fully connected operations is a linear operation in which every input is connected to every output by a weight. As such, a fully connected layer with N number of inputs and M outputs can have a total of N×M weights. As mentioned above, a Dense operation may be generally followed by a non-linear activation function to generate an output of that layer.

Some CNN network architectures may include several feature extraction portions that extract features at different granularities and a flattening layer (which may be referred to as a concatenation layer) that receives the output(s) of the last convolution layer of each of the extraction portions. The flattening layer aggregates all the features extracted by the different feature extraction portions into one input set. The output of the flattening layer may be fed into (i.e., used as input to) the fully connected layers of the classification portion.

FIG. 9B illustrates a high level block diagram of an example 950 of a CNN. In CNNs such as the example 950, convolutional layers are used for extracting features and fully connected layers are used as the classification layers.

In the example 950, an input image 952 may be partitioned into smaller portions 954 (e.g., blocks, tiles, pixel values, other information, or a combination thereof) that can be fed through (e.g., input to, etc.) one or more convolutional layers (e.g., convolutional layers 956 and 558), one or more max pooling layers (e.g., a pooling layer 960), and one or more fully connected layers (e.g., fully connected layers 962) to produce an output at an output layer 964. The output of the output layer 964 can be as described with respect to the region-of-interest detector 214 of FIG. 2. For example, the output can include a coordinates tuple identifying (e.g., can be for determining, etc.) a location and a size of an area of the image. The output can also include a probability value indicating a confidence level that the area of the image is a region-of-interest. However, in other examples, other outputs (or output formats) are possible.

The words "example" or "implementation" are used herein to mean serving as an example, instance, or illustration. Any aspect or design described herein as "example" or "implementation" is not necessarily to be construed as preferred or advantageous over other aspects or designs. Rather, use of the words "example" or "implementation" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the system 600 (and the algorithms, methods, techniques, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably.

Further, in one aspect, for example, the system 600 can be implemented using a computer or processor with a computer program that, when executed, carries out any of the respective methods, algorithms, techniques, and/or instructions described herein, such as the technique 800. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for generating a training image for use in training a region-of-interest detector, wherein the region-of-interest detector is trained to detect regions-of-interest within images, comprising:

generating a closed geometric shape;

filling the closed geometric shape with a filler to obtain a blob;

overlaying the blob on an edge of an image to obtain the training image, wherein the image comprises a region-of-interest and a background region, and wherein the edge separates the region-of-interest from the background region; and using the training image to train the region-of-interest detector to detect a boundary of the region-of-interest, wherein an input to the region-of-interest detector in a training phase comprises:

the training image; and a first indication of coordinates of the region-of-interest in the training image; and wherein an output of the region-of-interest detector comprises:

a second indication of an area of the training image, and a probability of the area of the training image being the region-of-interest.

2. The method of claim 1, wherein generating the closed geometric shape comprises:

obtaining the closed geometric shape using a Fourier series.

3. The method of claim 2, wherein obtaining the closed geometric shape using the Fourier series comprises:

obtaining the closed geometric shape using a random number of sine waves or random amplitudes of Fourier coefficients.

4. The method of claim 1, wherein the filler is a random noise.

5. The method of claim 1, wherein the filler is a single color.

6. The method of claim 1, wherein the filler is a filler image.

7. The method of claim 1, wherein the blob is overlaid on a vertex of the region-of-interest.

8. An apparatus for generating a training image for use in training a region-of-interest detector, wherein the region-of-interest detector is trained to detect regions-of-interest within images, the apparatus comprising:

a processor configured to:

generate a closed geometric shape;

fill the closed geometric shape with a filler to obtain a blob;

overlay the blob on an edge of an image to obtain the training image, wherein the image comprises a region-of-interest and a background region, and wherein the edge separates the region-of-interest from the background region; and train, using the training image, the region-of-interest detector to detect a boundary of the region-of-interest, wherein an input to the region-of-interest detector in a training phase comprises the training image, and wherein an output of the region-of-interest detector comprises an indication of an area of the training image as being the region-of-interest.

9. The apparatus of claim 8, wherein to generate the closed geometric shape comprises to:

obtain the closed geometric shape using a Fourier series.

10. The apparatus of claim 9, wherein to obtain the closed geometric shape using the Fourier series comprises to:

obtain the closed geometric shape using a random number of sine waves or random amplitudes of Fourier coefficients.

11. The apparatus of claim 8, wherein the filler is a random noise.

12. The apparatus of claim 8, wherein the filler is a single color.

13. The apparatus of claim 8, wherein the filler is a filler image.

14. The apparatus of claim 8, wherein the blob is overlaid on a vertex of the region-of-interest.

15. A non-transitory computer-readable storage medium, comprising executable instructions that, when executed by a processor, facilitate performance of operations for generating a training image for use in training a region-of-interest detector, wherein the region-of-interest detector is trained to detect regions-of-interest within images, the operations comprising operations to:

generate a closed geometric shape;

fill the closed geometric shape with a filler to obtain a blob; and overlay the blob on an edge of an image to obtain the training image, wherein the image comprises a region-of-interest and a background region, and wherein the edge separates the region-of-interest from the background region.

16. The non-transitory computer-readable storage medium of claim 15, wherein to generate the closed geometric shape comprises to:

obtain the closed geometric shape using a Fourier series.

17. The non-transitory computer-readable storage medium of claim 16, wherein to obtain the closed geometric shape using the Fourier series comprises to:

obtain the closed geometric shape using a random number of sine waves or random amplitudes of Fourier coefficients.

18. The non-transitory computer-readable storage medium of claim 15, wherein the filler is a random noise.

19. The non-transitory computer-readable storage medium of claim 15, wherein the filler is a single color.

20. The non-transitory computer-readable storage medium of claim 15, wherein the blob is overlaid on a vertex of the region-of-interest.

* * * * *